(12) United States Patent
Kawase

(10) Patent No.: US 7,316,079 B2
(45) Date of Patent: Jan. 8, 2008

(54) METHOD FOR DRYING RESIN PELLETS

(75) Inventor: Hatsuhiko Kawase, Aichi-ken (JP)

(73) Assignee: Star Seiki Co., Ltd., Nagoya-shi (JP)

( * ) Notice: Subject to any disclaimer, the term of this patent is extended or adjusted under 35 U.S.C. 154(b) by 384 days.

(21) Appl. No.: 10/971,295

(22) Filed: Oct. 22, 2004

(65) Prior Publication Data

US 2006/0037210 A1    Feb. 23, 2006

(30) Foreign Application Priority Data

Aug. 23, 2004    (JP) .............................. 2004-242186

(51) Int. Cl.
    *F26B 5/04*    (2006.01)
(52) U.S. Cl. .............................. 34/412; 34/423; 34/482
(58) Field of Classification Search ................. 34/403, 34/406, 412, 418, 423, 482, 92
    See application file for complete search history.

(56) References Cited

U.S. PATENT DOCUMENTS 3,969,314 A * 7/1976 Grigull ........................ 524/425
5,570,516 A * 11/1996 Huang ........................... 34/179

FOREIGN PATENT DOCUMENTS

JP    2001-79840 A    3/2001
JP    2003285330 A *  10/2003

* cited by examiner

*Primary Examiner*—Jiping Lu
(74) *Attorney, Agent, or Firm*—Frishauf, Holtz, Goodman & Chick, P.C.

(57) ABSTRACT

An apparatus for drying resin pellets to be supplied to a molding machine under reduced pressure of a desired level by a reduced pressure drying means comprises a preheating means for heating resin pellets to be supplied to the reduced pressure drying means to a temperature level that allows the moisture of the resin pellets to turn into steam under reduced pressure but maintain the resin pellets in an unmolten state.

20 Claims, 12 Drawing Sheets molding machine

METHOD FOR DRYING RESIN PELLETS

BACKGROUND OF THE INVENTION

1. Field of the Invention

This invention relates to an apparatus for and a method of drying resin pellets to be supplied to a molding machine in advance.

2. Description of Related Art

Resin pellets are used as molding material for producing molded products. Water can adhere to resin pellets in the course of transportation and eventually penetrate into the inside so as to be held there in a state of bound water. As resin pellets to which moisture is adhering and/or that are containing water in a state of bound water are supplied to a molding machine for producing molded products, the moisture contained in the synthetic resin that is molten in the metal mold can become steam and discharged to the outside of the metal mold. Such steam can form stripes or the like on the surface of the molded products to damage the appearance of the products as it is discharged and the residual moisture in the metal mold can modify the resin composition to make it no longer possible to maintain the resin in a desired state particularly in terms of characteristics of the resin so that consequently defective molded products can be produced. Therefore, it is necessary to eliminate moisture from resin pellets in advance and dry them when they are supplied to a molding machine.

Conventional apparatus for and methods of drying resin pellets include those described in Japanese Patent Application Laid-Open Publication No. 2001-79840 (Patent Document 1). With the resin pellets drying method described in Patent Document 1, resin pellets to be supplied to a molding machine are fed into a drying means in advance and heated for demoisturizing and drying under reduced pressure in it.

However, with the above described known drying method, while the boiling point of water falls under reduced pressure so that water is turned into steam at a temperature lower than the boiling point under the atmospheric pressure, which is 100° C., it takes a long time to heat the moisture of resin pellets and turn it into steam so that it is not possible to achieve a high drying efficiency because the thermal conductivity falls under reduced pressure. Particularly, resin pellets are thermally insulating and it is highly difficult to heat bound water to a temperature level good for turning it into steam under reduced pressure. Therefore, it is not possible to dry resin pellets in a short period of time.

This problem may be dissolved by heating resin pellets for a long period of time under reduced pressure. Then, however, it is necessary to consume a vast amount of energy for drying them and the time necessary for drying resin pellets will become extremely long relative to the time spent by a molding machine to consume the resin pellets. The net result is a poor matching of the drying process and the molding process, which by turn obstructs an efficient molding operation. This problem may be avoided by arranging a large reduced pressure drying apparatus at a position separated from corresponding molding machines so as to dry a large volume of resin pellets at a time and distributing the dried resin pellets to the molding machines. Then, however, the apparatus is very large by definition and there arises a high risk problem that moisture contained in the atmosphere of the plant can adhere to the resin pellets that are being supplied to the molding machines along with a novel problem that such a distribution system can entail loss of resin pellets to a considerable extent.

SUMMARY OF THE INVENTION

The present invention was developed to solve these and other shortcoming as described above, and it is therefore an object of the invention to provide an apparatus for drying resin pellets to be supplied to a molding machine under reduced pressure of a desired level by reduced pressure drying means, said apparatus comprising preheating means for heating resin pellets to be supplied to the reduced pressure drying means to a temperature level that allows the moisture of the resin pellets to turn into steam under reduced pressure but maintain the resin pellets in an unmolten state.

It is another object of the invention to provide a method of drying resin pellets to be supplied to a molding machine by heating them under reduced pressure by reduced pressure drying means, said method comprising heating resin pellets to be heated under reduced pressure by preheating means in advance to a temperature level that maintains the resin pellets in an unmolten state.

DETAILED DESCRIPTION OF THE PREFERRED EMBODIMENTS

Figure 1:
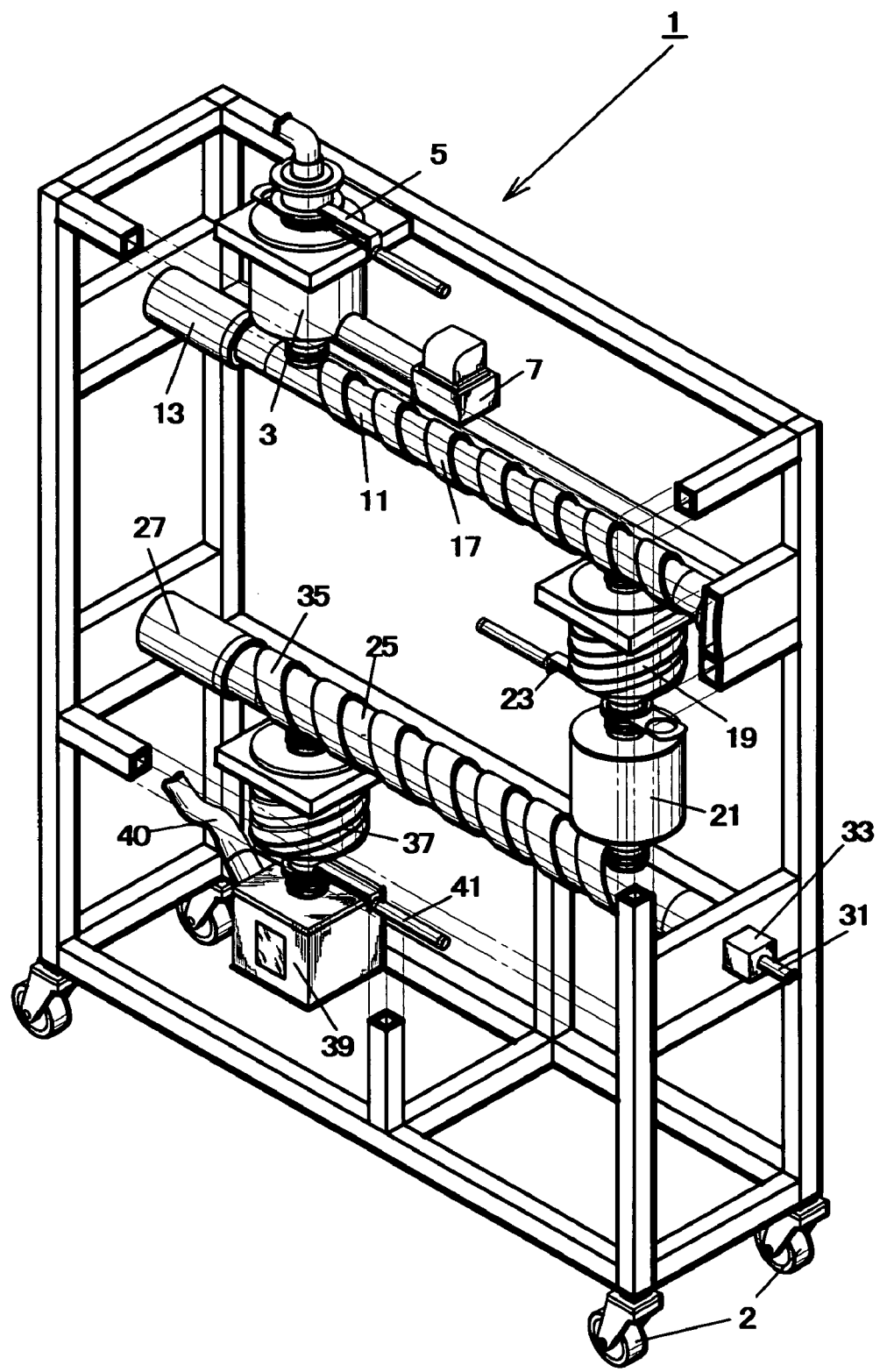
FIG. 1 is a schematic perspective view of an entire resin pellets drying apparatus according to the invention.
Figure 2:
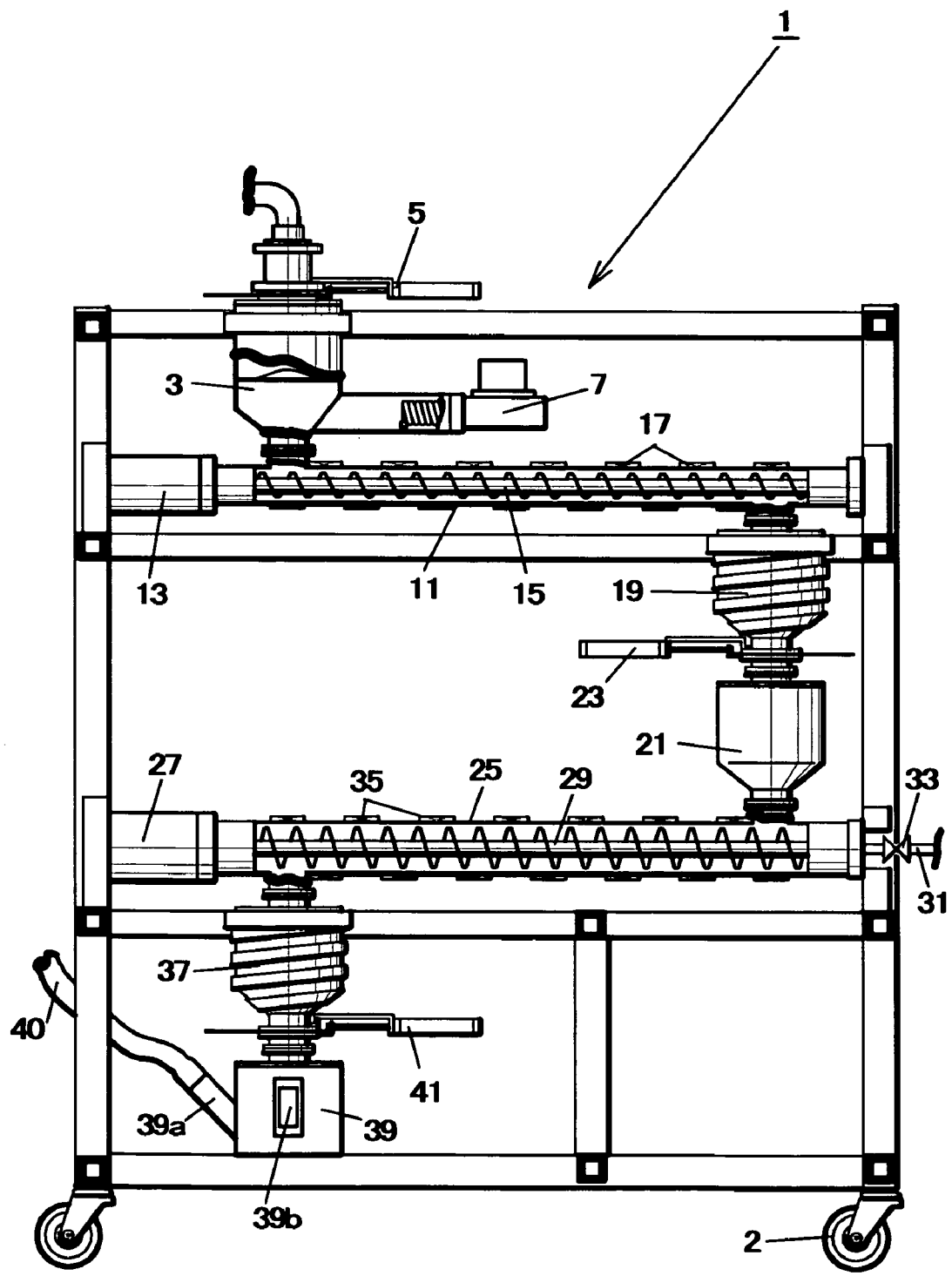
FIG. 2 is a partly cut out view of the resin pellets drying apparatus of FIG. 1, showing its structure.
Figure 3:
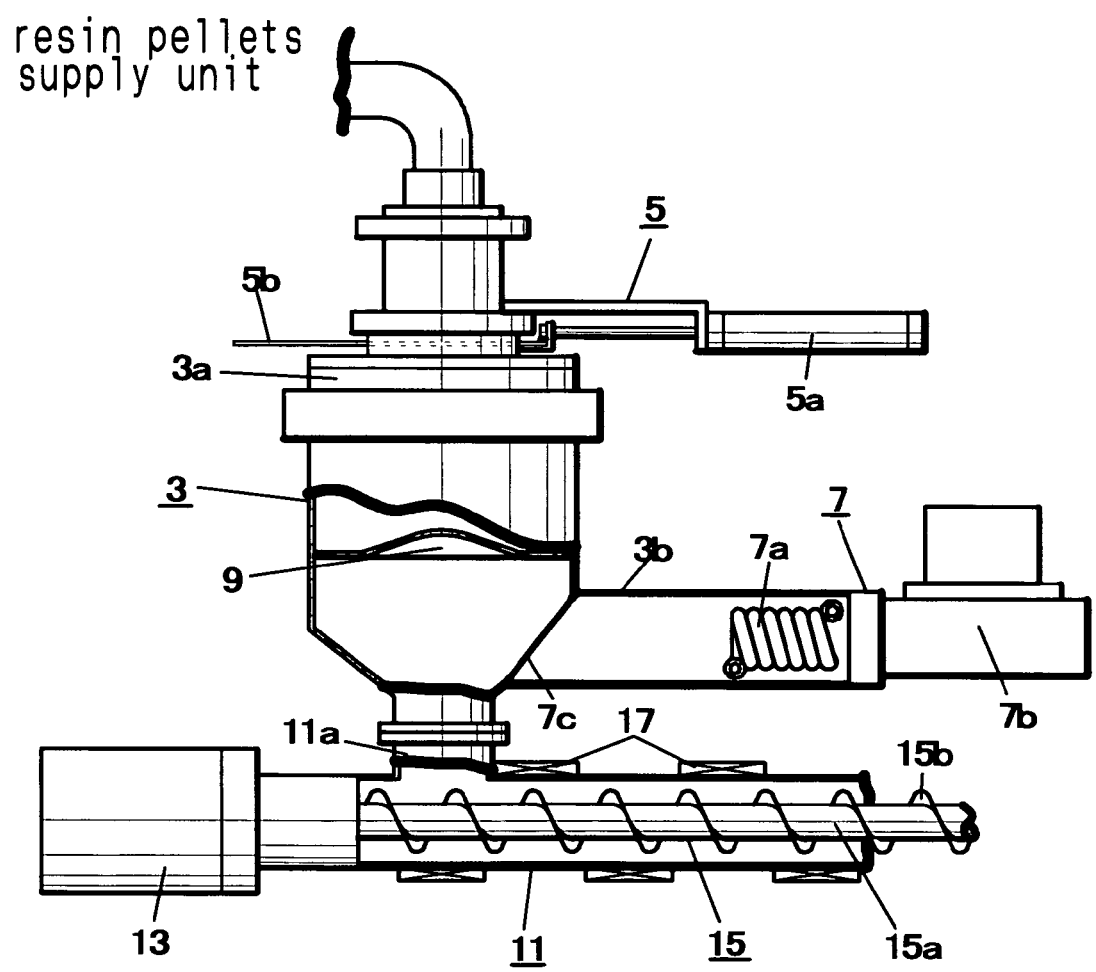
FIG. 3 is a partly cut out enlarged view of the preheating means of the apparatus of FIG. 1.

Now, the present invention will be described by referring to the accompanying drawings that illustrate preferred embodiments of the invention.

Referring firstly to FIGS. 1 through 6, resin pellets drying apparatus 1 is arranged separately from a molding machine (not shown) and comprises a preheating means and a reduced pressure drying means. A feed port 3a that is arranged at an upper part of preheating hopper 3, which is part of the preheating means, communicates with the inside and is connected to a resin pellets feeder (not shown) by way of a switch member 5. The switch member 5 is adapted to open and close a shutter 5b by means of an actuator 5a, which may be an electromagnetic solenoid or an air cylinder, so as to feed a predetermined amount of resin pellets RP into the preheating hopper 3. Reference number 2 in the drawings denotes casters fitted to the resin pellets drying apparatus 1.

The preheating hopper 3 is provided at a lower part thereof with a hot air supply port 3b that communicates with the inside of the hopper 3 and a hot air supply unit 7, which is also part of the preheating means and comprises a heating member 7a and a blower 7b, is fitted to the hot air supply port 3b. The air supplied from the blower 7b is heated by the heating member 7a so as to preheat the resin pellets RP in the preheating hopper 3 in such a way that the moisture adhering to the resin pellets RP and the bound water contained in the inside of the resin pellets RP can be boiled under reduced pressure at a temperature lower than 100° that is the boiling point of water under the atmospheric pressure, while the resin pellets RP are held in an unmolten state. Reference symbol 7c in the drawings denotes a network for preventing resin pellets RP from flowing into the hot air supply port 3b from the preheating hopper 3 during each preheating/drying process.

A baffle board 9 is arranged in the preheating hopper 3 so that, after feeding resin pellets RP into the preheating hopper 3, those that are dispersed irregularly in the preheating hopper 3 by the hot air blown to the resin pellets RP are forced to flow neatly and agitated into a uniform state. The baffle board 9 may be a vane (not shown) that is linked to an electric motor (not shown) and driven to revolve by the latter.

The preheating hopper 3 is connected to a supply port 11a of a transfer tube 11 at a lower part thereof. The transfer tube 11 is arranged substantially horizontally, preferably in a slightly inclined state with the other end (delivery side) of the transfer tube 11 located slightly lower than the supply port 11a. A feed screw 15 that is linked to an electric motor 13 is rotatably arranged in the inside of the transfer tube 11. The feed screw 15 extends all the way between the opposite ends of the transfer tube 11 along the axis thereof and pivoted at the other end (delivery side).

Figure 4:
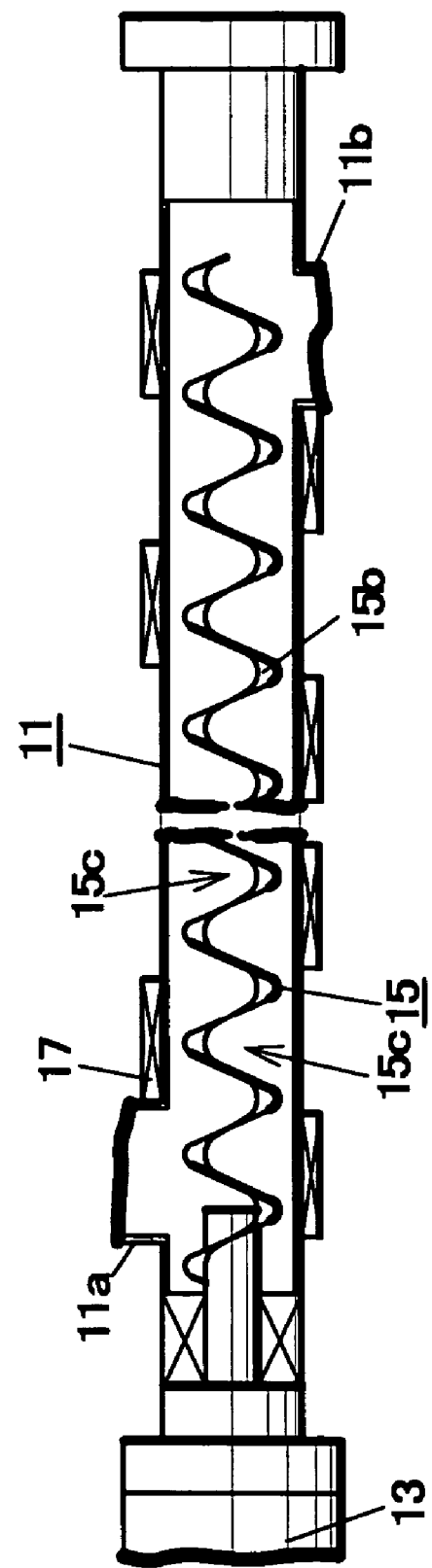
FIG. 4 is a schematic illustration of an alternative feed screw, showing its structure.
Figure 5:
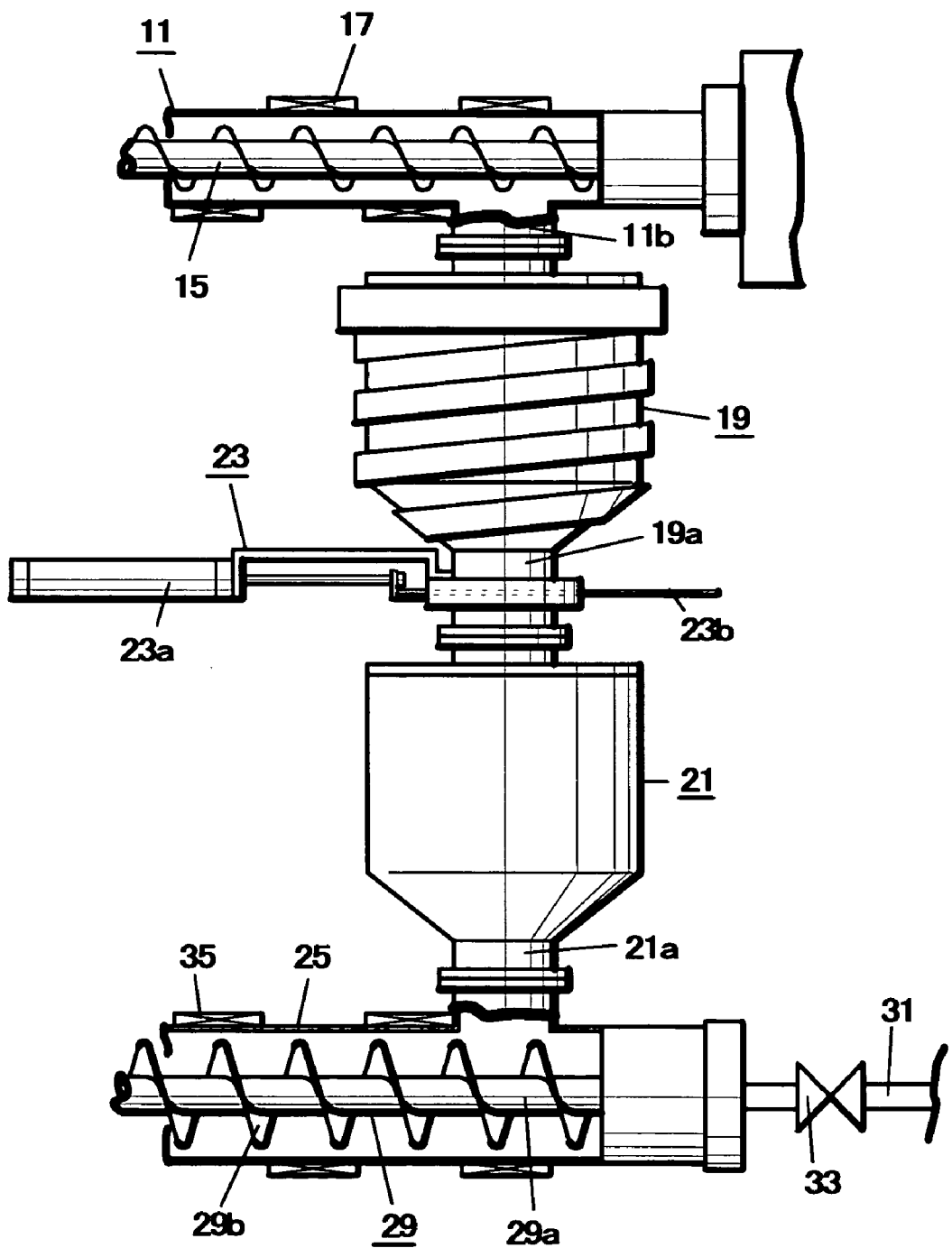
FIG. 5 is a partly cut out enlarged view of the reduced pressure heating means of the apparatus of FIG. 1.
Figure 6:
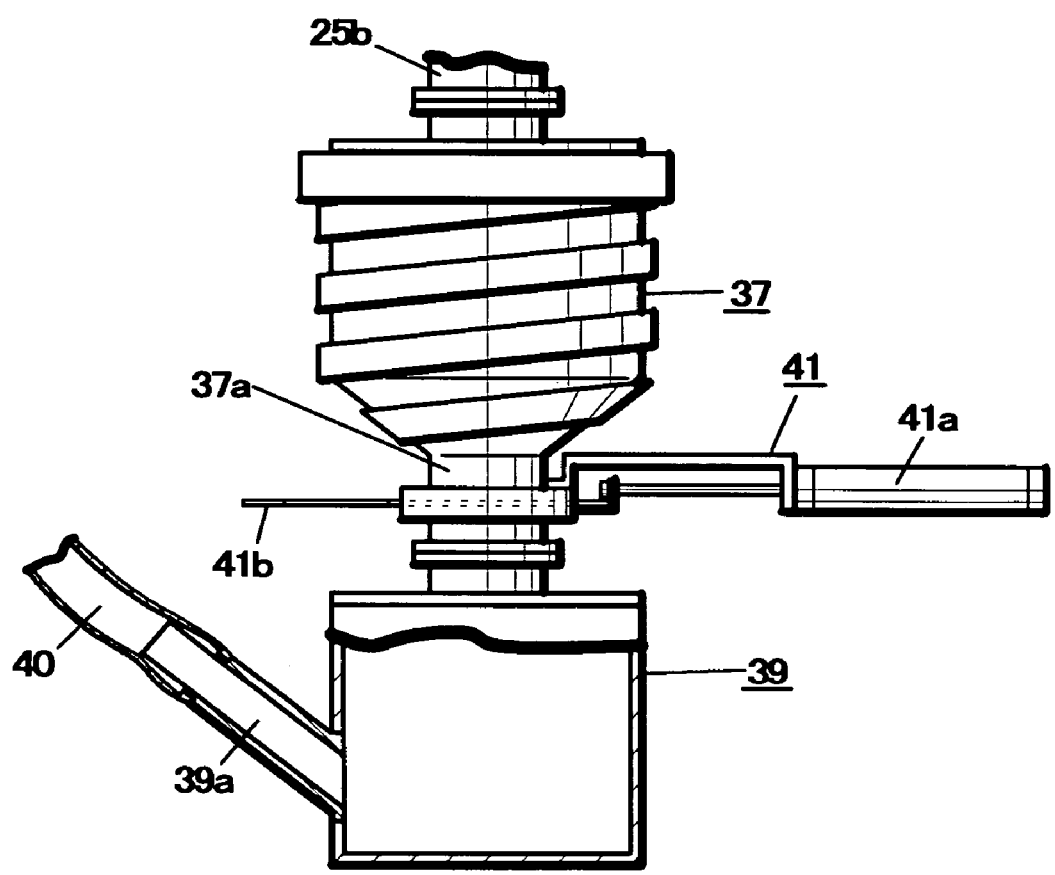
FIG. 6 is a partly cut out enlarged view of the part of the apparatus of FIG. 1 for supplying resin pellets RP to a molding machine after reduced pressure heating.

The feed screw 15 may have a shaft structure where an axially extending spiral screw blade 15b is fitted to the outer periphery of a shaft member 15a or a structure as shown in FIG. 4 where the screw blade 15b is provided at the center thereof with a hollow section 15c so that the preheated resin pellets RP that are being transferred in the transfer tube 11 may not be compressed excessively.

A heating member 17, which may be a surface heater or an electric heater, is fitted to the transfer tube 11. The heating member 17 heats the resin pellets RP that are being transferred in the transfer tube 11 so as to make them maintain the preheated state. The transfer tube 11 is provided at the other end (delivery side) with a delivery port 11b, which is connected to a buffer hopper 19. The buffer hopper 19 temporarily holds a predetermined amount of resin pellets RP that are transferred in a preheated state to it so as to make the preheating time matches the time required for reduced pressure drying, which will be described in greater detail hereinafter. The buffer hopper 19 is coated with a thermally insulating material so as to prevent the preheated resin pellets RP in the inside from cooling.

The buffer hopper 19 has a delivery port 19a to which a hopper 21 for reduced pressure drying is connected by way of a switch member 23. The switch member 23 is formed by linking an actuator 23a, which may be an electromagnetic solenoid or an air cylinder, to a shutter 23b so that the passageway from the buffer hopper 19 to the hopper 21 for reduced pressure drying may be opened and closed by the shutter 23b that is driven to move by the actuator 23a.

The hopper 21 for reduced pressure drying has a delivery port 21a that is connected to the supply port 25a of a reduced pressure drier tube 25 that the reduced pressure drying means comprises. Like the above described transfer tube 11, the reduced pressure drier tube 25 is arranged substantially horizontally, preferably in a slightly inclined state with the other end (delivery side) of the reduced pressure drier tube 25 located slightly lower than the supply port 25a and contains in the inside thereof a feed screw 29 that is linked to an electric motor 27 and rotatably pivoted. The feed screw 29 extends all the way between the opposite ends of the reduced pressure drier tube 25 along the axis thereof and the end thereof located opposite to the electric motor 27 is pivoted at the other end of the reduced pressure drier tube 25.

Like the above described feed screw 15, the feed screw 29 may have a shaft structure where an axially extending spiral screw blade 29b is fitted to the outer periphery of a shaft member 29a or a hollow structure where the screw blade 29b is provided at the center thereof with a hollow section (not shown). The feed screw 29 is adapted to expel steam-containing air from the resin pellets RP therein that are held in a preheated state by a heating member 35, which will be described in greater detail hereinafter, while transferring the resin pellets RP fed to one of the opposite ends of the reduced pressure drier tube 25 to the other end.

The reduced pressure drier tube 25 is connected at the other end thereof to an exhaust pipe 31 of an exhaust system (not shown) by way of a valve 33 so as to reduce the pressure in the inside of the reduced pressure drier tube 25 to a desired vacuum level (50 to 200 hpa). A heating member 35, which may be a surface heater or an electric heater, is fitted to the reduced pressure drier tube 25 and heats the resin pellets RP that are fed into the reduced pressure drier tube 25 so as to make them maintain the preheated state.

A stock hopper 37 is connected to the delivery port 25b of the reduced pressure drier tube 25 located at the other end thereof and a molding machine feed hopper 39 is connected to the delivery port 37a of the stock hopper 37 by way of a switch member 41.

Like the above described switch member 23, the switch member 41 is formed by linking an actuator 41a to a shutter 41b so that the passageway from the stock hopper 37 to the molding machine feed hopper 39 may be opened and closed by the shutter 41b that is driven to move by the actuator 41a.

The delivery port 39a of the molding machine feed hopper 39 is connected to a supply hose 40 that is connected to the injection unit supply section (not shown) of the molding machine so that a predetermined amount of resin pellets RP that have been dried under reduced pressure may be driven by pressurized blowing air generated by a blower (not shown) arranged at the side of the molding machine and supplied into the injection unit of the molding machine. Reference symbol 39b in the drawings denotes a window for checking the amount of resin pellets RP remaining in the molding machine feed hopper 39.

Now, the reduced pressure drying operation of resin pellets RP by means of the resin pellets drying apparatus 1 and the reduced pressure drying method used for the resin pellets drying apparatus 1 will be described below.

Figure 7:
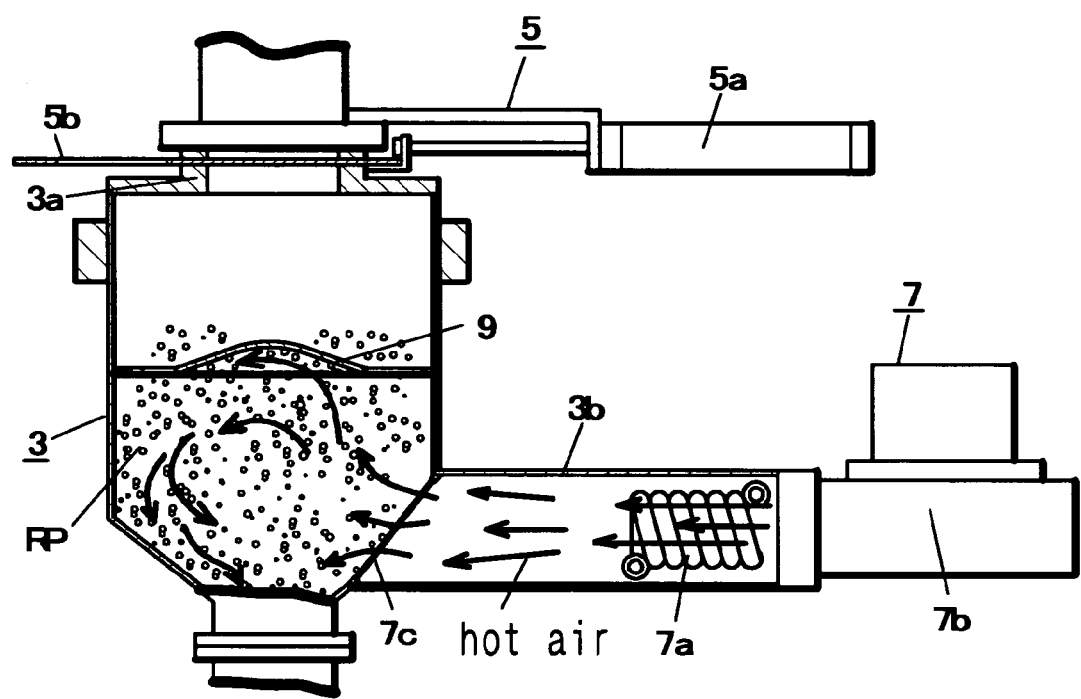
FIG. 7 is a schematic illustration of preheating of resin pellets.

Firstly, the switch member 5 is opened and a predetermined amount of resin pellets RP is supplied into the preheating hopper 3. Subsequently, while the switch member 5 is closed, the hot air supply unit 7 is operated in a manner as shown in FIG. 7 so as to blow hot air into the preheating hopper 3 and preheat the resin pellets RP in the preheating hopper to a temperature level that allows the moisture adhering to the surfaces of the resin pellets RP and the bound water contained in the resin pellets RP to become steam without melting the resin pellets RP.

Note that, while the resin pellets RP may partly move into the close end of the transfer tube 11 when the resin pellets RP are preheated, those resin pellets RP that have entered the transfer tube 11 are driven back into the preheating hopper 3 by the pressure of heated air that is blown into the preheating hopper 3 so that the entire resin pellets RP will be preheated substantially uniformly.

Figure 8:
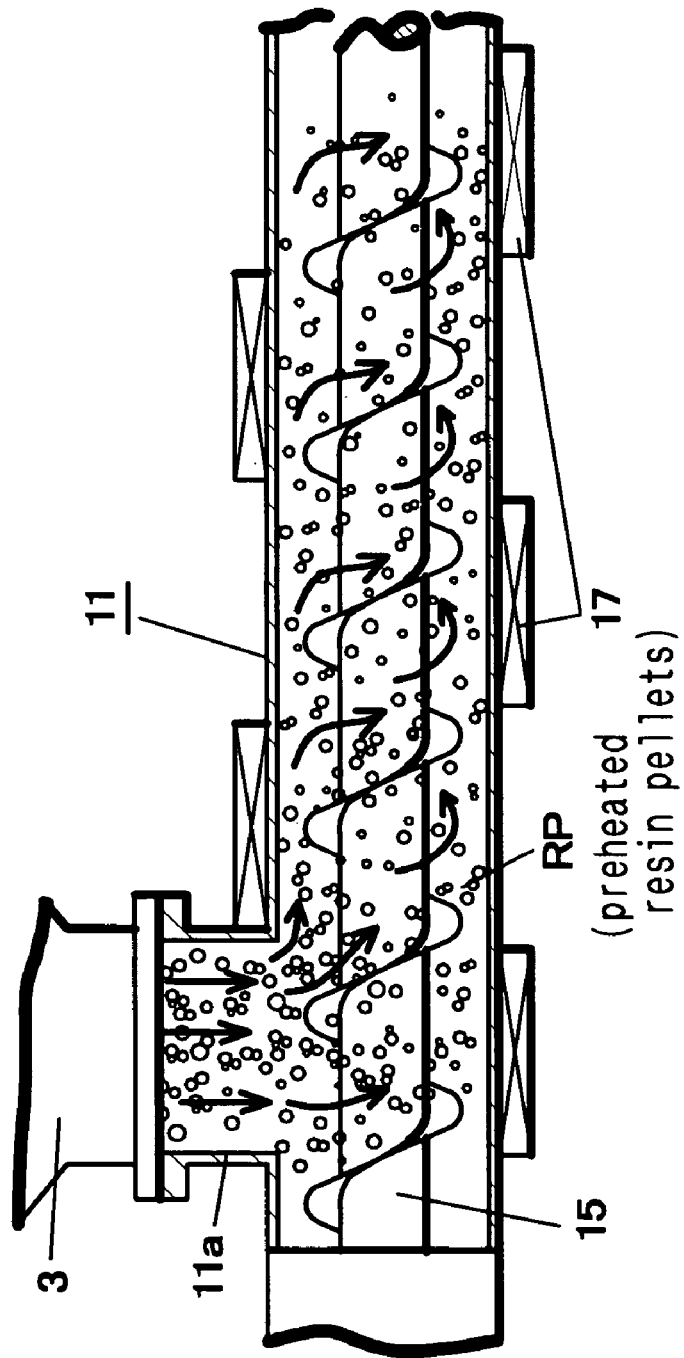
FIG. 8 is a schematic illustration of transfer of preheated resin pellets.

As the preheating process of heating the resin pellets RP in the preheating hopper 3 is over, the feed screw 15 in the transfer tube 11 is driven to revolve and transfer the preheated resin pellets RP in the preheating hopper 3 toward the remote end of the transfer tube 11 as shown in FIG. 8. During this transfer operation, the preheated resin pellets RP are heated by the heating member 17 arranged at the transfer tube 11 so as to have the resin pellets RP maintain its preheated state. The resin pellets RP that are driven by the revolving feed screw 15 and reach the remote end of the transfer tube 11 are introduced into the buffer hopper 19 and temporarily stored there.

As the stock hopper 37 is emptied, the switch member 23 is opened and the preheated resin pellets RP that are temporarily stored in the buffer hopper 19 are fed into the hopper 21 for reduced pressure drying and then the switch member 23 is closed to close the passageway from the buffer hopper 19 to the hopper 21 for reduced pressure drying.

Figure 9:
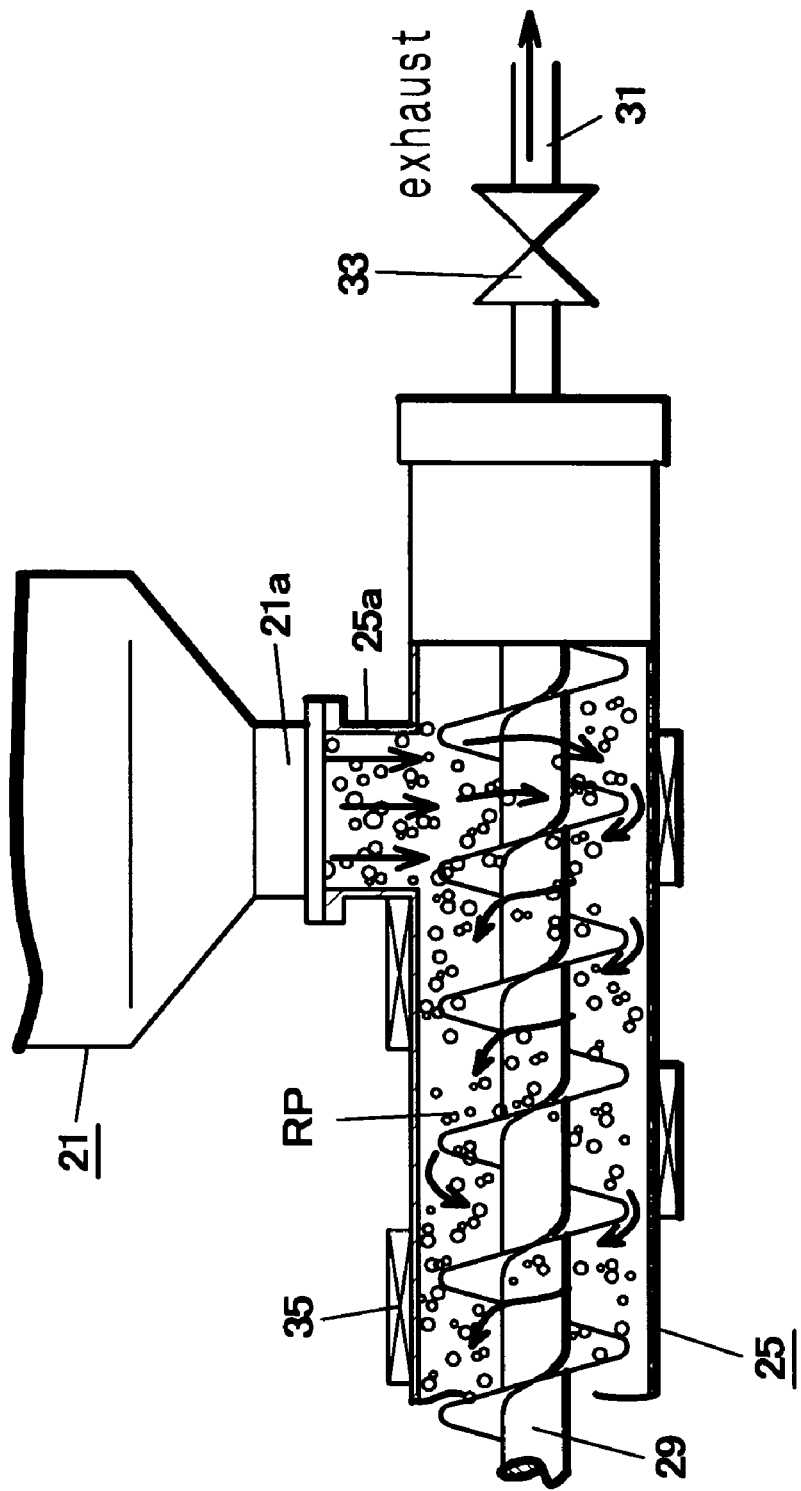
FIG. 9 is a schematic illustration of resin pellets being dried under reduced pressure.
Figure 10:
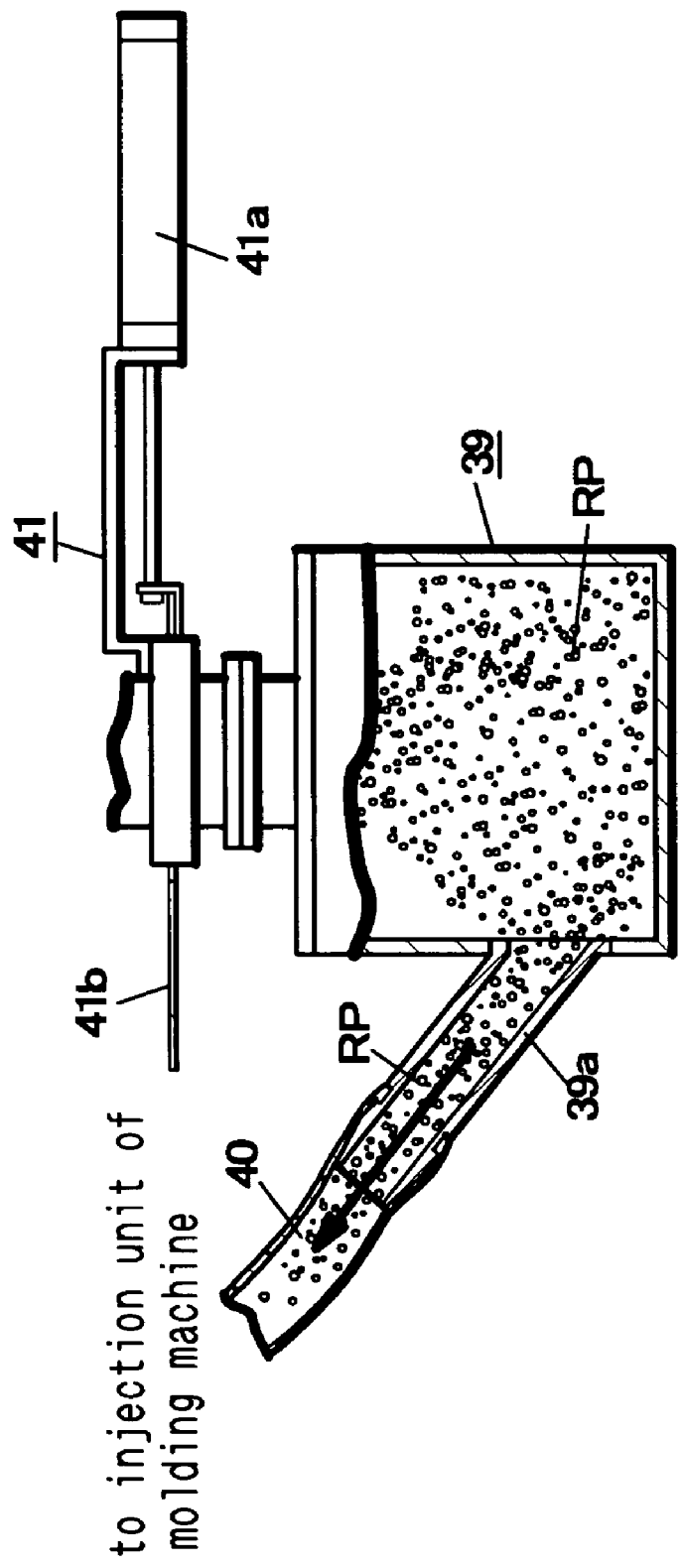
FIG. 10 is a schematic illustration of supply of dried resin pellets.

The preheated resin pellets RP fed into the hopper 21 for reduced pressure drying is then transferred from the close end of the reduced pressure drier tube 25 to the remote end thereof by the revolving feed screw 29 as shown in FIG. 9. During this transfer operation, the reduced pressure drier tube 25 is heated by the heating member 35 so as to hold the resin pellets RP to the temperature good for maintaining preheated state or a slightly higher temperature. Since the valve 33 is opened and the inside of the reduced pressure drier tube 25 is exhausted to reduce the pressure therein to a predetermined pressure level during the transfer operation, the water in the preheated resin pellets RP boils to become steam and, at the same time, fly out so as to be removed from the inside with air due to the pressure difference. Consequently the resin pellets RP are demoisturize and dried.

The resin pellets RP that is dried by the above described operation are transferred to the remote end of the reduced pressure drier tube 25 and stored in the stock hopper 37. When a predetermined amount of resin pellets RP is stored in the stock hopper 37 and a resin pellets supply signal is output from the molding machine, the switch member 41 is opened and the dried resin pellets RP in the stock hopper 37 are fed into the molding machine feed hopper 39. The dried resin pellets RP fed into the molding machine feed hopper 39 are then supplied to the injection unit of the molding machine by pressurized blown air generated by the blower.

Thus, conventionally, when the resin pellets RP that are supplied to the injection unit of a molding machine are heated under pressure for drying, they are thermally insulated by the reduced pressure to make it difficult to raise the temperature of the resin pellets RP to a level that allows the moisture thereof to boil. To the contrary, with this embodiment, the resin pellets RP are preheated to a desired temperature level for the drying operation under reduced pressure so that it is possible to turn the moisture adhering to the resin pellets RP and the bound water contained in them into steam efficiently regardless if the resin pellets RP are held under reduced pressure. As a result, the time required for drying the resin pellets RP can be reduced to a large extent and hence it is possible to make the molding time of the molding machine and the time necessary for consuming the resin pellets RP adequately match the time for drying the resin pellets RP. Thus, the molding operation can be carried out highly efficiently.

The above-described embodiment may be modified in any of the different ways as described below.

1. The feed screw 15 is controlled both for forward revolutions and for backward revolutions to actively agitate the resin pellets RP in the transfer tube 11 and, at the same time, heat them by the heating member 17 so as to maintain the preheated state. If the feed screw 15 is driven to revolve only in one sense for transfer, the resin pellets RP transferred to the remote end of the transfer tube 11 can be softened by the revolutions of the feed screw 15 to adhere to each other and turned into blocks. This problem can be avoided by controlling the feed screw 15 for forward revolutions and backward revolutions to prevent the softened resin pellets RP from being compressed excessively and turned into blocks.

2. The feed screw 29 is controlled both for forward revolutions and for backward revolutions as in 1. above to positively agitate the resin pellets RP in the tube 25 for reduced pressure drying so as to make the drying operation reliably proceed under reduced pressure.

3. Rod-shaped heaters that can be fitted respectively to the insides of the shaft members of the feed screws 15 and 29 are used for the heating members 17 and 35.

4. While the resin pellets RP preheated in the preheating hopper 3 are transferred by means of the feed screw 15 in the transfer tube 11 so as to make the preheating process temporally matches the heating process that is conducted under reduced pressure in the above described embodiment, it is not absolutely necessary to transfer the preheated resin pellets RP by means of the transfer tube 11 and the feed screw 15 arranged in the transfer tube 11. Alternatively, the resin pellets RP preheated in the preheating hopper 3 may be directly fed into a hopper for heating under reduced pressure for a heating process that is conducted under reduced pressure.

5. According to the present invention, it is essential that resin pellets RP are preheated to a predetermined temperature level before drying the resin pellets RP by heating under reduced pressure so as to make it possible to turn the moisture that adheres to the resin pellets RP and the bound water that becomes contained in them during the drying process conducted under reduced pressure into steam. In other words, the transfer tube 11 for transferring the preheated resin pellets RP, the feed screw 15 thereof, the reduced pressure drier tube 25 and the feed screw 29 thereof are not indispensable elements of the present invention.

Figure 11:
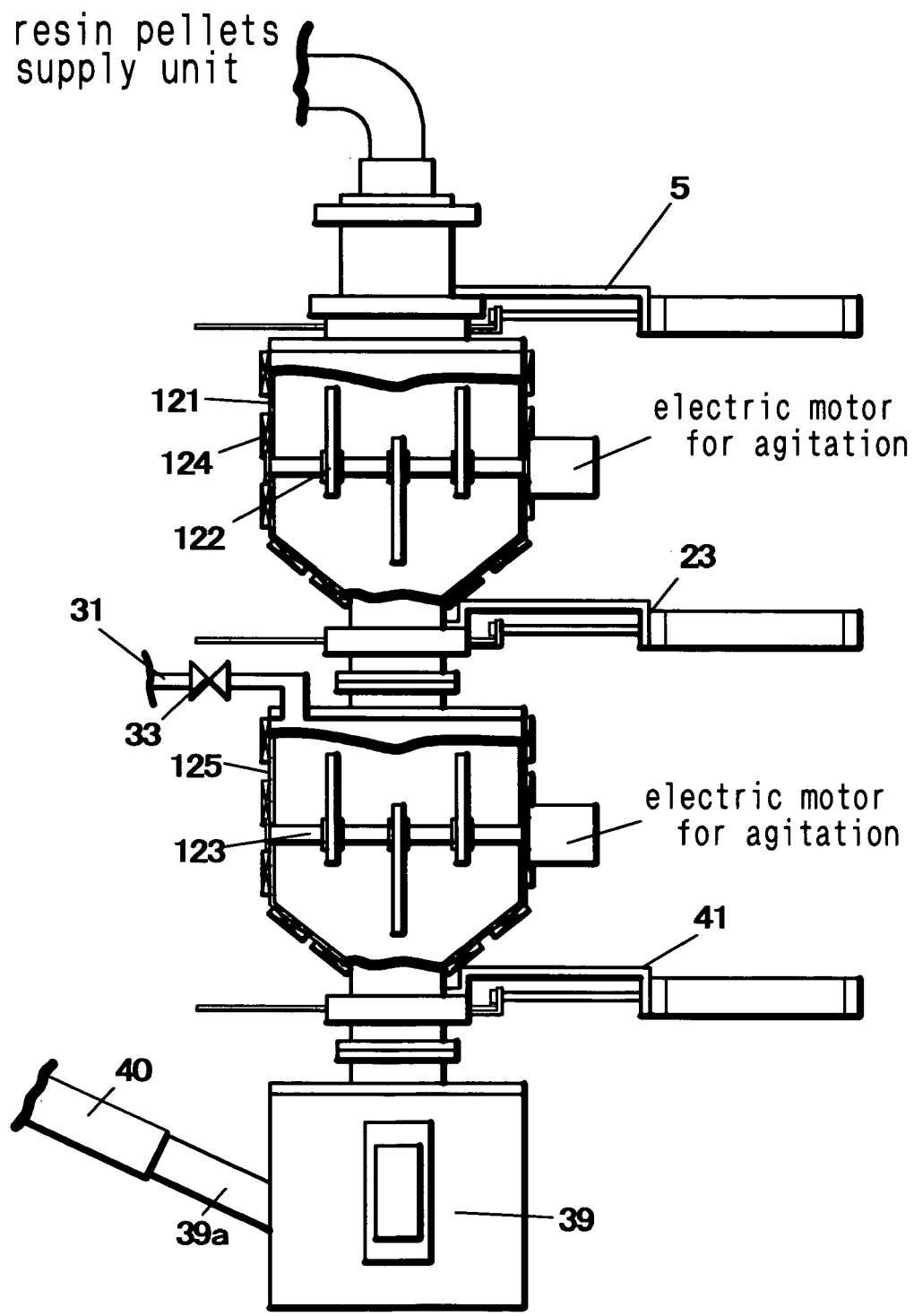
FIG. 11 is a schematic illustration of a modified embodiment.

For example, referring to FIG. 11, the resin pellets RP fed into a preheating hopper 121 is preheated to a temperature level that can turn the moisture adhering to the resin pellets RP and the bound water contained in them into steam under reduced pressure but maintain the resin pellets RP in an unmolten state by means of a heating member 124 while agitating the resin pellets RP by means of an agitating member 122 such as a screw or a bar member arranged in the inside and subsequently the preheated resin pellets RP are directly fed into a hopper 125 for heating under reduced pressure in which an agitating member 123 such as a screw or a bar member is rotatably arranged so as to heat the resin pellets RP under reduced pressure in order to demoisturize and dry the resin pellets RP while agitating them in the hopper 125 for heating under reduced pressure. With this arrangement, the hopper 125 for heating under pressure may be provided with a heating member for maintaining the preheated state of resin pellets RP and heating the resin pellets RP fed into it. In FIG. 11, the components same as those of the above-described embodiment are denoted respectively by the same reference symbols and will not be described any further.

Figure 12:
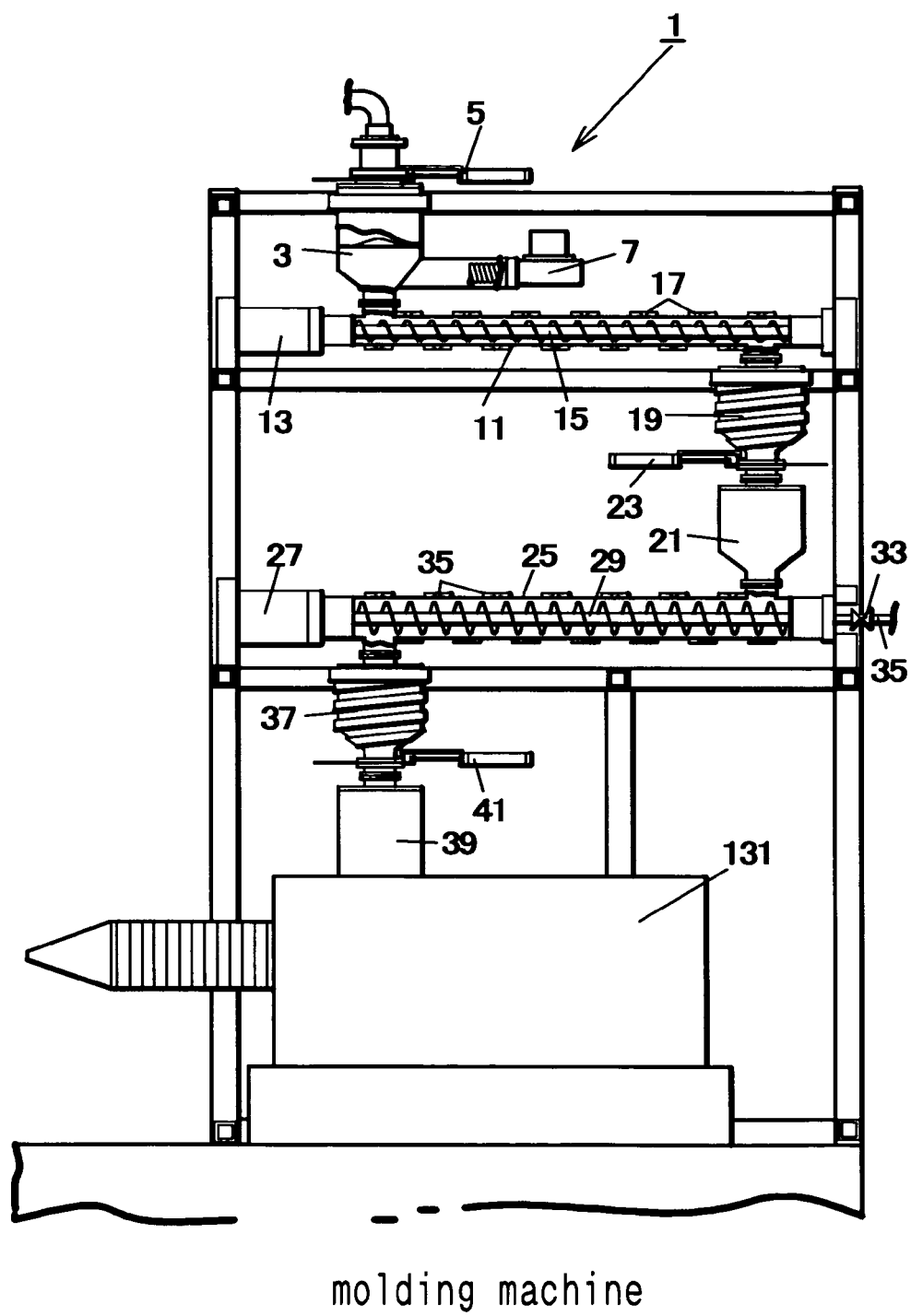
FIG. 12 is a schematic illustration of another modified embodiment.

6. While the resin pellets drying apparatus 1 according to the invention is arranged separately from a molding machine and the dried resin pellets RP are then supplied to the injection unit of the molding machine by pressurized blown air in the description of the above embodiment, the present invention is by no means limited to the above described embodiment. For example, as shown in FIG. 12, the present invention may be so embodied that the molding machine feed hopper 39 of the resin pellets drying apparatus 1 according to the invention is fitted to the resin supply section of the injection unit 131 of a molding machine so that dried resin pellets RP may be directly supplied to the injection unit 131.

7. While the heating members 17 and 35 are arranged respectively on the outer surface of the transfer tube 11 and the outer surface of the reduced pressure drier tube 25 to maintain the preheated state of the preheated resin pellets RP in the above description, the heating members 17 and 35 may be omitted if the transfer tube 11 and the reduced pressure drier tube 25 are formed by using a thermally insulating material and structured so as to maintain the preheated state of the resin pellets RP in them.

What is claimed is:

1. A resin pellet drying method comprising:
    preheating resin pellets in preheating means to heat the resin pellets to a desired temperature at which the resin pellets are not molten;
    introducing the preheated resin pellets from the preheating means into reduced pressure drying means;
    forming a reduced pressure state in the reduced pressure drying means after the preheated resin pellets from the preheating means have been introduced into the reduced pressure drying means by exhausting air inside the reduced pressure drying means while blocking both a supply port and a delivery port of the reduced pressure drying means;
    rotating a screw in the reduced pressure drying means, while the reduced pressure state is formed, to move the preheated resin pellets through the reduced pressure drying means to the delivery port;
    heating the resin pellets to a temperature at which the resin pellets are not molten during their movement through the reduced pressure drying means, while the reduced pressure state is formed, to thereby subject the resin pellets to dehumidifying and drying; and
    discharging the dehumidified and dried resin pellets from the reduced pressure drying means by opening the delivery port of the reduced pressure drying means once the resin pellets in the reduced pressure drying means have been moved to the delivery port.

2. The resin pellet drying method according to claim 1, wherein the preheating step comprises blowing heated air to the resin pellets to heat the resin pellets to a desired temperature at which the resin pellets are not molten.

3. The resin pellet drying method according to claim 1, further comprising storing the resin pellets discharged from the reduced pressure drying means in a stock hopper.

4. The resin pellet drying method according to claim 1, wherein the preheating step comprises:
    feeding resin pellets into a preheating hopper;
    arranging a rotatable screw in a tube having a supply port communicating with an outlet of the preheating hopper and a delivery port;
    rotating the screw to move the resin pellets from the supply port to the delivery port; and
    heating the resin pellets during their movement through the tube.

5. The resin pellet drying method according to claim 4, wherein the preheating step further comprises agitating the resin pellets while the resin pellets are present in the tube.

6. The resin pellet drying method according to claim 5, wherein the resin pellets are agitated by alternating a direction of rotation of the screw in the tube.

7. The resin pellet drying method according to claim 4, wherein the preheating step further comprises blowing heated air into the preheating hopper to heat the resin pellets to a desired temperature at which the resin pellets are not molten.

8. The resin pellet drying method according to claim 4, wherein the step of heating the resin pellets during their movement through the tube comprises one of arranging a surface heater on the tube and arranging a rod-shaped heater on an inside of a shaft member of the screw in the tube.

9. The resin pellet drying method according to claim 4, further comprising adjusting a residual time of the resin pellets in the tube.

10. The resin pellet drying method according to claim 9, wherein the residual time of the resin pellets in the tube is adjusted by controlling a rotational direction of the screw in the tube in forward and reverse directions.

11. The resin pellet drying method according to claim 4, further comprising arranging the tube to be substantially horizontal and defining the supply port at one end region and the delivery port at an opposite end region.

12. The resin pellet drying method according to claim 1, further comprising agitating the resin pellets while the resin pellets are present in the reduced pressure drying means.

13. The resin pellet drying method according to claim 12, wherein the resin pellets are agitated by alternating a direction of rotation of the screw in the reduced pressure drying means.

14. The resin pellet drying method according to claim 1, further comprising adjusting a residual time of the resin pellets in the reduced pressure drying means.

15. The resin pellet drying method according to claim 14, wherein the residual time of the resin pellets in the reduced pressure drying is adjusted by controlling a rotational direction of the screw in the reduced pressure drying means in forward and reverse directions.

16. The resin pellet drying method according to claim 1, wherein the step of heating the resin pellets during their movement through the reduced pressure drying means comprises one of arranging a surface heater on a tube around the screw and arranging a rodshaped heater on an inside of a shaft member of the screw in the reduced pressure drying means in order to heat the resin pellets.

17. The resin pellet drying method according to claim 1, further comprising arranging the screw in a substantially horizontal tube defining the delivery port of the reduced pressure drying means at one end region.

18. The resin pellet drying method according to claim 1, further comprising arranging a buffer between the preheating means and the reduced pressure drying means to enable a time for preheating resin pellets via the preheating means to match a time for reduced pressure drying resin pellets via the reduced pressure drying means.

19. The resin pellet drying method according to claim 1, wherein the reduced pressure drying means includes a reduced pressure drying hopper having a delivery port communicating with the supply port of the reduced pressure drying means, which is provided in a tube around the screw, and the method further comprises arranging an openable and closable switch member between the preheating means and the reduced pressure drying hopper and closing the switch member to block the supply port of the reduced pressure drying means when forming the reduced pressure state in the reduced pressure drying means.

20. The resin pellet drying method according to claim 1, wherein air inside the reduced pressure drying means is exhausted by means of a valve connected to a tube around the screw.

* * * * *